(12) United States Patent
Radzevich

(10) Patent No.: US 9,702,448 B2
(45) Date of Patent: Jul. 11, 2017

(54) DIFFERENTIAL HAVING LIGHT WEIGHT BEVEL GEARING

(71) Applicant: EATON CORPORATION, Cleveland, OH (US)

(72) Inventor: Stephen Radzevich, Sterling Heights, MI (US)

(73) Assignee: Eaton Corporation, Cleveland, OH (US)

( * ) Notice: Subject to any disclaimer, the term of this patent is extended or adjusted under 35 U.S.C. 154(b) by 89 days.

(21) Appl. No.: 14/402,730

(22) PCT Filed: May 22, 2013

(86) PCT No.: PCT/US2013/042205
§ 371 (c)(1),
(2) Date: Nov. 21, 2014

(87) PCT Pub. No.: WO2013/177270
PCT Pub. Date: Nov. 28, 2013

(65) Prior Publication Data
US 2015/0141194 A1    May 21, 2015

Related U.S. Application Data

(60) Provisional application No. 61/650,062, filed on May 22, 2012.

(51) Int. Cl.
*F16H 48/08* (2006.01)
*B60K 17/16* (2006.01)
(Continued)

(52) U.S. Cl.
CPC ........... *F16H 48/08* (2013.01); *B60K 17/165* (2013.01); *F16H 55/0846* (2013.01);
(Continued)

(58) Field of Classification Search
None
See application file for complete search history.

(56) References Cited

U.S. PATENT DOCUMENTS 5,728,025 A    3/1998   Ishikawa et al.
6,139,461 A   10/2000   Eschenburg
(Continued)

FOREIGN PATENT DOCUMENTS

DE    10 2008 063105 A1    7/2010

OTHER PUBLICATIONS

Radzevich, S., "Theory of Gearing: Kinematics, Geometry, and Synthesis: Chapter 15 Approximate Real Gearing", CRC Press, Boca Raton, Florida, (2012), 42 pages.
(Continued)

*Primary Examiner* — Justin Holmes
*Assistant Examiner* — Timothy M Hannon
(74) *Attorney, Agent, or Firm* — Merchant & Gould P.C.

(57) ABSTRACT

A differential for use in a vehicle drive train having a pair of rotary members including a gear case that is operatively supported in driven relationship with respect to the drive train and a pair of side gears mounted for rotation with a respective one of the rotary members in the gear case. The differential also includes a spider mounted for rotation with the gear case and at least one pair of pinion gears mounted for rotation with the spider and in meshing relationship with the side gears. The side gears have concave teeth flanks and the pinion gears have convex teeth flanks to increase power density through the differential.

15 Claims, 2 Drawing Sheets

(51) Int. Cl.
*F16H 55/08* (2006.01)
*F16H 48/38* (2012.01)
*F16H 48/06* (2006.01)

(52) U.S. Cl.
CPC ............ *F16H 48/06* (2013.01); *F16H 55/088* (2013.01); *F16H 2048/087* (2013.01); *F16H 2048/382* (2013.01)

(56) References Cited

U.S. PATENT DOCUMENTS

2009/0241710 A1 10/2009 Suzuki et al.
2010/0317483 A1* 12/2010 Radzevich .......... F16H 55/0846
                    475/230

OTHER PUBLICATIONS

International Search Report for corresponding International Patent Application No. PCT/US2013/042205 mailed Sep. 30, 2013.

* cited by examiner

DIFFERENTIAL HAVING LIGHT WEIGHT BEVEL GEARING

This application is a National Stage Application of PCT/US2013/042205, filed 22 May 2013, which claims benefit of U.S. Patent application Ser. No. 61/650,062 filed on 22 May 2012, and which applications are incorporated herein by reference. To the extent appropriate, a claim of priority is made to each of the above disclosed applications.

BACKGROUND TEACHINGS

1. Field Teachings

The present teachings relate, generally, to differentials, and more specifically to a differential having light weight bevel gearing.

2. Description of the Related Art

Differentials are well known devices used in vehicle drive trains. These devices operate to couple a pair of rotating members, such as drive shafts or axle half shafts about a rotational axis. Thus, differentials have been employed as a part of transfer cases that operatively couple the front and rear axles of a vehicle, in open differentials as well as limited slip and locking differentials used to couple axle half shafts, and other applications commonly known in the art.

Differentials of the type known in the related art may include a housing and a gear case that is operatively supported by the housing for rotation by a vehicle drive train. The differential typically includes at least a pair of side gears. The side gears are splined for rotation with a pair of rotating members, such as axle half shafts. A spider having cross pins is operatively mounted for rotation with the gear case. Pinion gears are mounted for rotation with the cross pins and in meshing relationship with the side gears. Differential rotation of the side gears and thus the axle half shafts may be obtained through rotation of the pinion gears relative to the cross pins as is commonly known in the art.

In all practical designs of intersected-axis gearing, for example, in straight bevel gearing, spiral bevel gearing, etc., the side gear teeth are stronger, while the pinion gear teeth are weaker. This is due to the difference in tooth count in the side gear and in the pinion gear: the larger the tooth count, the stronger gear tooth and vice versa. Therefore, to increase power density through the gear set, it is required first to take care of the pinion gear (teeth of which are weaker) and not of the mating side gear (teeth of which are stronger). Moreover, it is common to sacrifice a portion of strength of the side gear teeth in order to increase the strength of the pinion gear teeth. In an ideal case, strength of the side gear teeth and strength of the pinion gear teeth are equal to one another.

It is shown (see, for example a monograph: Radzevich, S. P., *Theory of Gearing: Kinematics, Geometry*, and *Synthesis*, CRC Press, Boca Raton Fla., 2012, 856 pages), that the power, P, being transmitted by a gear pair is shared equally within a face width of the gear tooth. Assume that a pinion gear in a gear set is sliced on a large number of equally thin slices each of which is perpendicular to the pinion gear axis of rotation. As all the slices are of equal thickness, then equal power is transmitting through each slice.

Power, P, being transmitting by a pinion gear can be expressed in terms of the applied torque, T, and of the rotation of the pinion gear, R, $$P = T*R \quad (1)$$

After being sliced, all the pinion gear slices have the same rotation, R. As the rotations of all the slices are equal, then the torque being transmitting is also shared equally within a face width of the pinion gear.

While differentials of the type generally known in the art and as described above have worked for their intended purposes, certain disadvantages remain. More specifically, there remains ongoing and continuous efforts to improve the operation of such differentials. One disadvantage associated with such differentials is the use of bevel gears with straight teeth for the mating surfaces between the pinion gears and the side gears. Due to both the side gears and pinion gears being beveled, an axial thrust is exerted in the pinion-to-side gear mesh acting outwards of the centerline of the axes. This creates an additional load onto the differential case and results in a relatively heavy weight of the differential case to withstand the load. Power density through the differential is limited by the geometry of contact of the interacting teeth flanks of the side gear and of the pinion gear.

Thus, there remains a need in the art for a differential that allows for the smooth meshing interaction between the pinion gears and its associated side gears to increase power density through the differential while reducing weight of the differential.

SUMMARY TEACHINGS

The present teachings include a differential for use in a vehicle drive train including a pair of rotary members. The differential includes a gear case operatively supported in driven relationship with respect to the vehicle drive train. A pair of side gears is mounted for rotation with a respective one of the rotary members in the gear case. A spider is mounted for rotation with the gear case. The differential also includes at least one pair of pinion gears mounted for rotation with the spider and in meshing relationship with the side gears. The side gears have concave teeth flanks and the pinion gears have convex teeth flanks to increase power density through the differential.

In one aspect of the present teachings, the side gears as well as the pinion gears have straight teeth. The side gears are internal bevel gears with a relatively small pitch cone angle (the pitch cone angle in the range of 10 to 30 degrees). The side gears feature concave teeth flanks and the pinion gears feature convex teeth flanks. Geometry of interaction of concave teeth flanks of the side gears with convex teeth flanks of the pinion gears is more favorable as its bearing capacity is significantly higher. Favorable geometry of contact of concave teeth flanks of the side gears with convex teeth flanks of the pinion gears makes it possible to increase power density through the differential. Favorable load distribution within line of contact of teeth flanks of the side gears and pinion gears is an additional advantage of the differential. This feature also works for weight reduction, as well as for an increase of power density through the differential. Accordingly, the present teachings result in a differential that facilitates smooth operation of the meshing gears, but which may be manufactured to be light weight.

BRIEF DESCRIPTION OF THE DRAWINGS

Other aspects of the present teachings will be readily appreciated, as the same becomes better understood after reading the subsequent description taken in connection with the accompanying drawings wherein.

DETAILED DESCRIPTION

Figure 1:
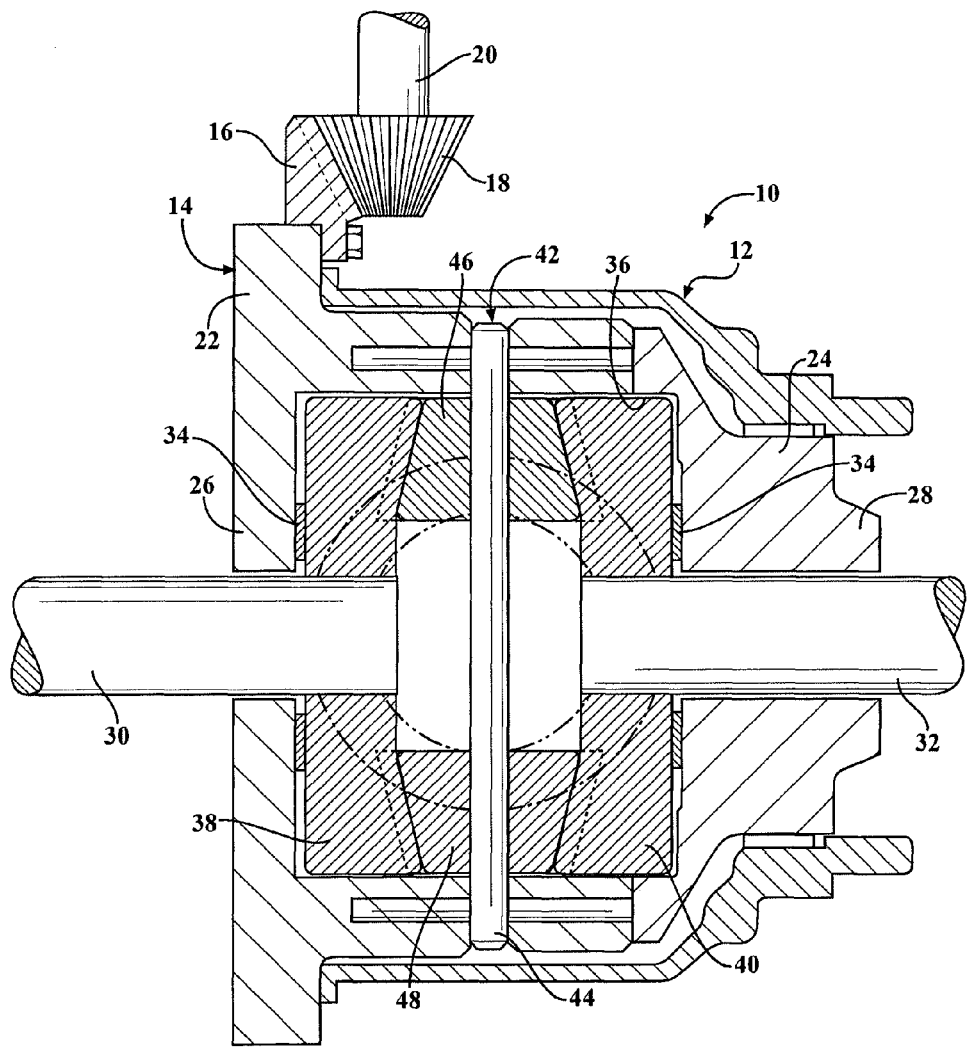
FIG. 1 is a cross-sectional side view of a representative example of a differential of the type that may employ the present teachings.
Figure 2:
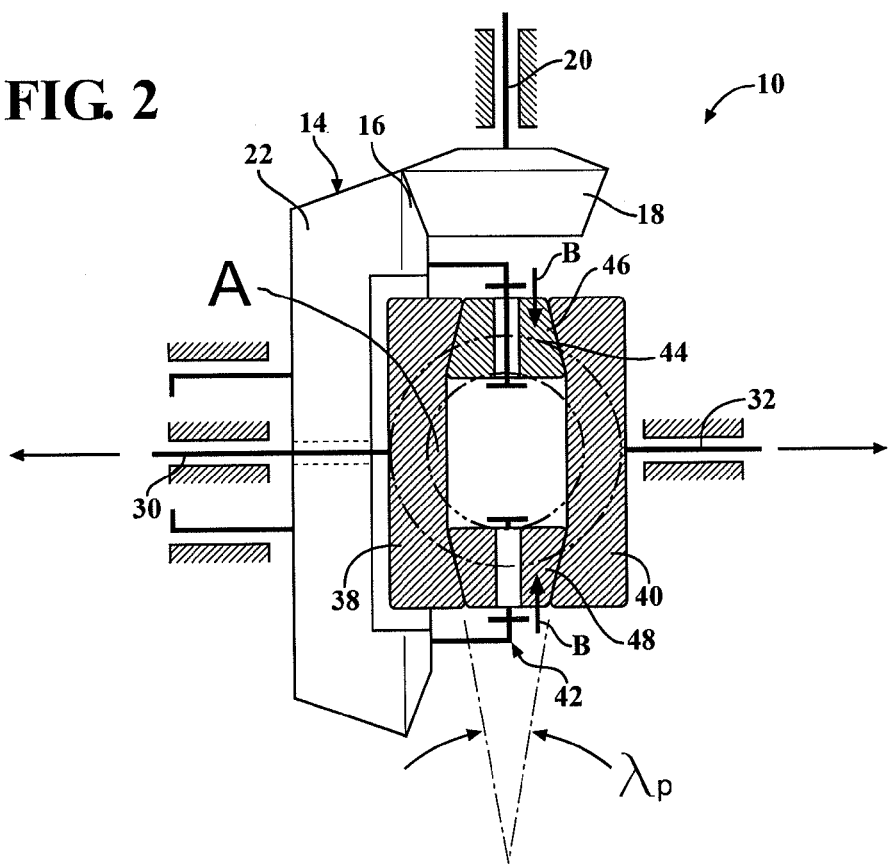
FIG. 2 is a diagrammatic view of the differential of FIG. 1.

One representative example of a differential of the type that may employ a side gear and a pinion gear of the type contemplated by the present teachings is generally shown at 10 in FIGS. 1 and 2, where like numerals are used to designate like structure throughout the drawings. The differential 10 is designed to be employed as a part of a drive train for any number of vehicles having a power plant that is used to provide motive force to the vehicle. Thus, those skilled in the art will appreciate in light of the disclosure that the differential 10 may be employed as a part of a transfer case that operatively couples the front and rear axis of a vehicle, in an open differential, a limited slip differential or locking differential used to couple axle half shafts, as well as other applications commonly known in the art. The limited slip or locking differentials may be hydraulically actuated or electronically actuated and therefore include coupling mechanisms, such as friction clutches employed to operatively couple the axle half shafts together under certain operating conditions. It will be appreciated in light of the disclosure that the purpose of the differential 10 illustrated in FIGS. 1 and 2 is merely to provide one basic representative example of a device that may employ the features of the present teachings, and is not meant to limit the application of the present teachings to the type of differential represented therein.

With this in mind, in its most elementary configuration, the differential 10 may include a housing, generally indicated at 12. A gear case, generally indicated at 14, may be operatively supported in the housing 12 for rotation in driven relationship by the drive train, as is commonly known in the art. To this end, a ring gear 16 may be operatively mounted to the gear case 14. The ring gear 16 is typically designed to be driven in meshing relationship with a pinion gear 18 fixed to a drive shaft 20 or some other driven mechanism. The gear case 14 may be defined by two end portions 22, 24 that are operatively fixed together in any conventional manner known in the related art. Those skilled in the art will appreciate in light of the disclosure that the gear case 14 and housing 12 may be defined by any conventional structure known in the related art and that the present teachings are not limited to the particular housing 12 illustrated here nor a gear case 14 defined by two end portions 22, 24. Similarly, the gear case 14 may be driven by any conventional drive mechanism known in the related art and that the present teachings are not limited to a gear case 14 that is driven via a ring gear, pinion, and drive shaft.

Each end portion 22, 24 of the gear case 14 may include a hub 26, 28 that supports one of a pair of rotary members, such as axle half shafts 30, 32 with the aid of bearings 34 or the like. The gear case 14 defines a cavity 36. A pair of side gears 38, 40, according to the present teachings, are mounted for rotation with a respective one of a pair of rotary members 30, 32 in the cavity 36 defined by the gear case 14. Typically, the side gears 38, 40 are each splined to a corresponding one of the axle half shafts 30, 32. A spider, generally indicated at 42, is mounted for rotation with the gear case 14. The spider 42 includes at least one pair of cross pins 44. In addition, the differential 10 also includes at least one pair of pinion gears 46, 48, according to the present teachings. In the example illustrated in these figures, the spider 42 includes two pair of cross pins 44 and two pair of pinion gears 46, 48. Each of the pinion gears 46, 48 is mounted for rotation on a corresponding one of the cross pins 44 and in meshing relationship with a corresponding one of the pair of side gears 38, 40.

Figure 3:
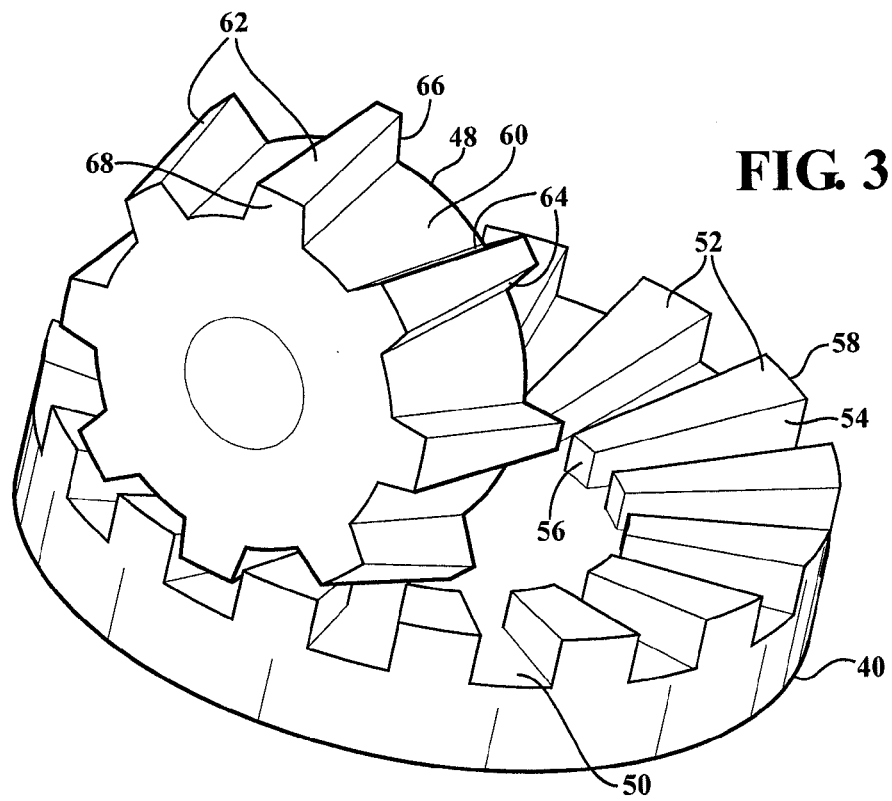
FIG. 3 is a perspective view of bevel gearing for the differential of FIG. 1.

With this background in mind, attention is now directed to FIG. 3 wherein one of the side gears 38, 40 and one of the pinion gears 46, 48 are shown in meshing relationship. As illustrated, the side gear 40 is generally circular in shape with a concave teeth flank 50. The side gear 40 has a plurality of teeth 52 disposed and spaced circumferentially about the teeth flank 50. The teeth 52 have sides 54 extending radially outwardly. The sides 54 may be planar or convex in shape. The teeth 52 have a circumferential thickness or width at a radial toe or inner end 56 that is less than a circumferential thickness or width at a radial heel or outer end 58. The teeth 52 have a relatively small cone pitch angle in a range of approximately 170 degrees to approximately 150 degrees as indicated by arrow A in FIG. 2. By way of the included examples, the side gears 38, 40 can be internal bevel gears.

The pinion gears 46, 48 mesh with the side gears 38, 40. As illustrated, the pinion gear 48 is generally circular in shape with a convex teeth flank 60. The pinion gear 48 has a plurality of teeth 62 disposed and spaced circumferentially about the teeth flank 60. The teeth 62 have sides 64 extending radially outwardly. The sides 64 may be planar or convex in shape. The teeth 62 have a circumferential thickness at a radial toe or inner end 66 that is less than a circumferential thickness or width at a radial heel or outer end 68. It should be appreciated in light of the disclosure that the side gears 38, 40 can be internal bevel gears.

The teeth 62 of the pinion gears 46, 48 have a relatively small cone pitch angle in a range of approximately 0 degrees to approximately 20 degrees. The face contact ratio of the internal bevel gear set should exceed one, preferably in the range of approximately 1.1 to approximately 1.5. It should be appreciated in light of the disclosure that a permissible face width for the gear set depends on (a) tooth number of the side gear, (b) tooth number of the pinion gear, (c) pressure angle of the gear mesh, and (d) pitch cone angles of the side gear and pinion gear. It should also be appreciated in light of the disclosure that manufacture of the side gears and pinion gears can be accomplished with available forging technology. The pinion gears 46, 48 can have relatively large diameter faces facing toward the centerline of the axles and it can be shown that such an arrangement of the gear set results in the axial thrust that is exerted in the side gear-to-pinion gear mesh is acting towards the centerline of the axles as indicated by arrow B in FIG. 2. As such, these forces can negate one another and, in this way, reduce the total load the differential case 12 should withstand, thereby reducing the wall thickness of the differential case 12 and weight of the differential 10.

In order to attain favorable loading of the pinion gear tooth, in the present teachings, the pinion gear is turned upside down in relation to the mating side gear. This can make it possible for favorable loading of the pinion gear tooth: the stronger heel of the pinion gear tooth is loaded more heavily, while the weaker toe of the pinion gear tooth is loaded less heavy. In this way, it can be shown that the gear set is stronger and power density through the gear set is increased.

It will be appreciated in light of the present teachings that the pitch cone angle of the pinion gear, $\gamma_p$, should not be too large. Practical value of the pitch cone angle of the pinion gear can be shown to be within the interval $20°<\gamma_p<0°$. Otherwise pointing of the pinion gear tooth could occur.

For the determination of the mating gear tooth flank geometry, commercial software packages (ProE, Catia, Unigraphics, AutoCAD etc) can be used. CAD model of the mating gear tooth can be generated as an enveloping surface to successive positions of the pinion gear tooth in rotation of the last in relation to the side gear. It should be appreciated in light of the disclosure that at every instant of time, tooth flanks of the side gear and tooth flanks of the pinion gear can make point contact, and not line contact with one another.

The present teachings can be shown to overcome the deficiencies in the related art in a differential 10 that employs internal side gears 46, 48 featuring concave teeth flanks 50 and internal pinion gears 46, 48 featuring convex teeth flanks 60. Geometry of interaction of concave teeth flanks 50 of the side gears 46, 48 with convex teeth flanks 60 of the pinion gears 46, 48 can be shown to be more favorable as its bearing capacity is significantly higher. Favorable geometry of contact of concave teeth flanks 50 of the side gears 46, 48 with convex teeth flanks 60 of the pinion gears 46, 48 can be shown to make it possible to increase the power density thorough the differential 10.

The teachings have been described in great detail in the foregoing specification, and it is believed that various alterations and modifications of the many aspects of the present teachings will become apparent to those having ordinary skilled in the art from a reading and understanding of the specification. It is intended that all such alterations and modifications are included in the teachings, insofar as they come within the scope of the appended claims.

The following is a list of reference numerals used in the disclosure:

10 differential;
12 housing;
14 gear case;
16 ring gear;
18 pinion gear;
20 drive shaft;
22, 24 end portion;
26, 28 hub;
30, 32 axle half shafts;
34 bearings;
36 cavity;
38, 40 side gears;
42 spider;
44 cross pins;
46, 48 pinion gears;
50 teeth flank;
52 teeth;
54 sides;
56 inner end;
58 outer end;
60 teeth flank;
62 teeth;
64 sides;
66 inner end; and
68 outer end.

I claim:

1. A differential for use in a vehicle drive train including a pair of rotary members, said differential comprising:
   a gear case operatively supported in driven relationship with respect to the vehicle drive train;
   a pair of side gears mounted for rotation with a respective one of the rotary members in said gear case;
   a spider mounted for rotation with said gear case;
   at least one pair of pinion gears mounted for rotation with said spider and in meshing relationship with said side gears;
   said side gears having a concave surface and said pinion gears having a convex surface to increase power density through the differential; and
   wherein said side gears have a plurality of teeth disposed about and spaced circumferentially about said concave surface.

2. A differential as set forth in claim 1 wherein said teeth are straight.

3. A differential as set forth in claim 1 wherein said teeth have a circumferential thickness at a radial inner end that is less than a circumferential thickness at a radial outer end.

4. A differential as set forth in claim 1 wherein said teeth have a cone pitch angle in a range of approximately 170 degrees to approximately 150 degrees.

5. A differential as set forth in claim 1 wherein said side gears are internal bevel gears.

6. A differential as set forth in claim 1 wherein said pinion gears are internal bevel gears.

7. A differential for use in a vehicle drive train including a pair of rotary members, said differential comprising:
   a gear case operatively supported in driven relationship with respect to the vehicle drive train;
   a pair of side gears mounted for rotation with a respective one of the rotary members in said gear case;
   a spider mounted for rotation with said gear case;
   at least one pair of pinion gears mounted for rotation with said spider and in meshing relationship with said side gears; and
   said side gears having a concave surface and said pinion gears having a convex surface to increase power density through the differential;
   wherein said pinion gears have a plurality of teeth disposed about and spaced circumferentially about said convex surfaces.

8. A differential as set forth in claim 7 wherein said teeth are straight.

9. A differential as set forth in claim 7 wherein said teeth have a circumferential thickness at a radial inner end that is less than a circumferential thickness at a radial outer end.

10. A differential as set forth in claim 7 wherein said teeth have a cone pitch angle in a range of approximately 0 degrees to approximately 20 degrees.

11. A differential for use in a vehicle drive train including a pair of rotary members, said differential comprising:
   a gear case operatively supported in drive relationship with respect to the vehicle drive train;
   a pair of side gears mounted for rotation with a respective one of the rotary members in said gear case;
   a spider mounted for rotation with said gear case;
   at least one pair of pinion gears mounted for rotation with said spider and in meshing relationship with said side gears;
   said side gears having concave surfaces and said pinion gears having convex surfaces to increase power density through the differential;
   wherein said side gears have a plurality of straight teeth disposed about and spaced circumferentially about said concave surfaces and said teeth have a circumferential thickness at a radial inner end that is less than a circumferential thickness at a radial outer end; and
   wherein said pinion gears have a plurality of straight teeth disposed about and spaced circumferentially about said convex surfaces and said teeth have a circumferential thickness at a radial inner end that is less than a circumferential thickness at a radial outer end.

12. A differential as set forth in claim 11 wherein said teeth of said side gears have a cone pitch angle in a range of approximately 170 degrees to approximately 150 degrees.

13. A differential as set forth in claim 11 wherein said side gears are internal bevel gears.

14. A differential as set forth in claim 11 wherein said teeth of said pinion gears have a cone pitch angle in a range of approximately 0 degrees to approximately 20 degrees.

15. A differential as set forth in claim 11 wherein said pinion gears are internal bevel gears.

\* \* \* \* \*